Patented Mar. 24, 1953

2,632,752

UNITED STATES PATENT OFFICE 2,632,752

POLYMERIZABLE POLYESTER COMPOSITIONS

Thomas F. Anderson, Huntsville, Ala., assignor to Libbey-Owens-Ford Glass Company, Toledo, Ohio, a corporation of Ohio No Drawing. Application May 12, 1950,
Serial No. 161,745

14 Claims. (Cl. 260—40)

1

The invention relates to the preparation of polymerizable unsaturated polyester compositions having improved physical and chemical properties, and to the preparation of polymerized materials therefrom having improved water-resistance and electrical properties.

A polymerizable unsaturated polyester (i. e., a polymerizable unsaturated polyhydric alcohol-polycarboxylic acid polyester) is highly advantageous as a starting material for the production of hardened synthetic resins in that it is resinous in character before polymerization, and is fusible at a temperature at which polymerization is not rapid. Other heat-hardenable compositions, such as urea-formaldehyde and phenol-formaldehyde compositions, are much more difficult to fabricate because they do not exist as plastic resins at temperatures much below their hardening temperatures. Since a heat-hardenable composition can be shaped only while it is in a fused condition, the failure of other heat-hardenable compositions to reach a fused state below their hardening temperature is a great handicap in fabricating operations. By the time a urea-formaldehyde or phenol-formaldehyde composition has reached a fused state in a fabricating operation, its hardening already has begun, so that hardening interferes with the shaping or molding of the composition.

Still other heat-hardenable compositions, such as diallyl esters, have low melting points or are liquids at room temperature, but have the disadvantage that they do not attain a resinous state until after hardening has begun. Such compositions cannot be handled satisfactorily in the resinous state that they attain after hardening has begun because the hardening, once it has started, is very difficult to stop. Because of the difficulty of controlling the hardening of compositions such as diallyl esters once the hardening has reached the stage at which the compositions are resinous, such compositions ordinarily are shaped only by the casting method, which is the sole method by which they can be handled in non-resinous liquid form.

A polymerizable polyester is resinous because it is a polymer. The resinous state of such a polyester makes it possible to employ the polyester in a molding operation either alone or in admixture with a filler. A non-resinous liquid composition, such as a diallyl ester, cannot be used in a molding operation because it would be squeezed out of the filler and squirted out of the mold.

A saturated heat-hardenable polyester, such as glycerol phthalate, is hardened by esterification with elimination of water. A polyester that is hardened by esterification cannot be employed to make a molded article or other solid body because it is too difficult to remove water from the interior of such a solid body in order to complete the hardening. Even urea-formaldehyde and phenol-formaldehyde compositions tend to give off small amounts of volatiles as they are hardened in a mold. In contrast, a polymerizable unsaturated polyester hardens by polymerization without the evolution of volatiles.

For the foregoing reasons, a polymerizable unsaturated polyester is particularly well adapted for many industrial uses. However, a polymerizable unsaturated polyester has certain physical and chemical properties which leave something to be desired. For example, hardened or polymerized articles made from a molding compound containing such a polyester tend to have inferior water resistance and electrical properties.

Among the most useful articles produced from synthetic resins are those in which a filler is present. The filler may be a cellulosic material such as alpha cellulose, or a mineral material in the form of particles, such as clay, mica, silica or ground glass, or a mineral material in fiber form such as glass fiber or asbestos. Although the presence of a filler in a hardened synthetic resin may cause a substantial improvement in strength, the filler may still leave much to be desired in the electrical properties and water resistance of the hardened composition. For example, cellulose fibers are known to be useful as fillers in certain synthetic resins and to impart great strength to such resins because the resins adhere well to such fibers, but the natural attraction for moisture possessed by cellulose fibers limits the possibility of obtaining good water resistance and electrical properties in synthetic resins containing such fibers. On the other hand, mineral fillers, i. e., fibrous or non-fibrous fillers derived from a mineral source, do not possess a natural attraction for moisture as great as that of cellulose fibers. The present invention relates to a novel composition containing a polymerizable unsaturated polyester and a mineral filler of a specific type, and to articles produced by the polymerization of such a composition.

The principal object of the invention is the production of a novel polymerizable unsaturated polyester composition which, after polymerization, has greatly improved water resistance and electrical properties. More specific objects and advantages are apparent from the description, which merely discloses and illustrates and is not intended to limit the scope of the invention.

A material embodying the invention, which upon polymerization has improved water resistance and electrical properties, comprises dehydrated kaolin and a polymerizable unsaturated polyhydric alcohol-polycarboxylic acid polyester.

Dehydrated clays are well known materials produced from ordinary clays by a calcining operation at a temperature sufficient to drive off the chemically combined water and to effect the combustion of organic matter without fusing the clays. Dehydrated kaolin for use in the practice of the present invention may be prepared by heating ordinary kaolin (i. e., Georgia clay) in a rotary kiln at a temperature sufficient to drive off the chemically combined water (i. e., at least about 600° C.) but below the temperature which would produce sintering of the kaolin (i. e., about 1200° C.). If desired, a salt or hydroxide of an alkali or alkaline earth metal or of an amphoteric metal (e. g., sodium chloride, potassium chloride, sodium bromide, sodium nitrate, sodium sulfite, sodium hydroxide, calcium chloride, magnesium chloride, aluminum chloride, zinc chloride, or mixtures thereof) may be incorporated in the kaolin before heating. For example, dehydrated kaolin may be prepared by pulverizing ordinary kaolin (600 pounds) and sodium chloride (18 pounds) and heating the mixture in a batch-type rotary kiln for about five hours at a temperature of about 785° C. to produce a loss in weight of about 14.8 per cent of the mixture. If such a procedure is carried out at temperatures ranging from 900 to 965° C. the loss of weight of the mixture is about 15.0 per cent.

The reduction in water content produced by the dehydration of the kaolin would not have been expected to produce the marked improvement in results obtained in the practice of the invention. A reduction in the water content of other hydrous silicate minerals (e. g., chrysotile) does not produce such a marked improvement in the properties of the minerals for use as fillers in resinous compositions such as those used in the present invention. In fact, a polymerizable unsaturated polyester composition containing dehydrated chrysotile has approximately the same electrical properties and water resistance as a similar polyester composition containing untreated chrysotile. Moreover, the results obtained in the practice of the invention are much better than would be expected merely from the reduction of the water content of part or all of the filler. Therefore, it is believed that some other changes or molecular rearrangements may have taken place within the clay particle structure.

POLYMERIZABLE UNSATURATED POLYESTER

A polymerizable unsaturated polyhydric alcohol-polycarboxylic acid polyester used in the practice of the invention is prepared by reaction of one or more polyhydric alcohols and one or more polybasic acids. The proportion of polyhydric alcohols having more than two hydroxy groups, such as glycerol or pentaerythritol, and the proportion of polycarboxylic acids having more than two carboxy groups, such as citric acid, preferably is small so that in the production of the polyester there may be maximum esterification of the hydroxy and carboxy groups without attainment of excessive viscosity (i. e., through cross-linking). Ordinarily it is desirable that the unsaturated polyester be polymerizable into an infusible or high melting point resin, so that the proportion of unsaturated components should be such that the polyester contains an average of more than one double bond per molecule (for example, there may be an average of eleven or more double bonds in every ten molecules of the polyester); and for the purposes of the instant invention it is to be understood that the term "unsaturated polyester" means a polyester that is polymerizable into an infusible or high melting point resin.

The present invention is applicable to all polymerizable unsaturated polyhydric alcohol-polycarboxylic acid polyesters. A typical example of such a polyester is a product prepared by the reaction of an unsaturated dicarboxylic acid such as maleic, fumaric, itaconic, citraconic or mesaconic acid with a dihydric alcohol such as any polymethylene glycol in the series from ethylene glycol to decamethylene glycol, propylene glycol, any butylene glycol, any polyethylene glycol in the series from diethylene glycol to nonaethylene glycol, dipropylene glycol, any glycerol monobasic acid monoester (in either the alpha or beta position), such as monoformin or monoacetin, any monoether of glycerol with a monohydric alcohol, such as monomethylin or monoethylin, or any dihydroxy alkane in which the hydroxy radicals are attached to carbon atoms that are primary or secondary or both, in the series from dihydroxy butane to dihydroxy decane.

Maleic, fumaric, itaconic, citraconic and mesaconic acids are alkenedicarboxylic acids each having from four to five carbon atoms and having the carboxy groups attached to adjacent carbon atoms, the ethenedicarboxylic acids (i. e., butenedioic acids according to Geneva System nomenclature) being maleic and fumaric and the propenedicarboxylic acids being itaconic, citraconic and mesaconic. Each of such acids contains a polymerizably reactive $\Delta^{2,3}$-enedioyl group, and a polymerizable unsaturated polyester or alkyd prepared from any one of such acids contains a plurality of such polymerizably reactive $\Delta^{2,3}$-enedioyl groups. In other words, each of the acids contains a polymerizably reactive $\Delta^{2,3}$-eneoyl group (i. e., a group having the structure

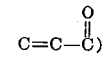

and such groups are contained in dioyl radicals in the polyester molecule; hence the dioyl radicals may be defined as $\Delta^{2,3}$-enedioyl radicals (e. g., butenedioyl or ethenedicarboxylyl radicals).

Part of the unsaturated dicarboxylic acid may be replaced by a saturated dicarboxylic acid, such as any normal acid in the series from oxalic acid and malonic acid to sebacic acid, or any benzene dicarboxylic, naphthalene dicarboxylic or cyclohexane dicarboxylic acid, or diglycolic, dilactic or resorcinol diacetic acid. All of the unsaturated acid may be replaced by a saturated acid if a polyhydric alcohol is present whose molecule has two or three free hydroxy groups and consists of an ether of one or two molecules of allyl or methallyl alcohol with one molecule of a polyhydroxy compound such as glycerol, pentaglycerol, pentaerythritol, butantetrol-1,2,3,4, a trihydroxy normal alkane having from four to five carbon atoms such as butantriol-1,2,3, or a monoalkyl ether of pentaerythritol or butantetrol-1,2,3,4 in which the alkyl radical has from one to four carbon atoms and has from one to two hydrogen atoms attached to the same carbon atom as the ether linkage, such as the monomethyl or monoisobutyl ether of pentaerythritol.

In the practice of the invention the preferred polymerizable unsaturated polyhydric alcohol-polycarboxylic acid polyesters are the so-called "linear" polyesters, i. e., those which have very little cross-linking in the polyester molecules, as evidenced by the fact that such polyesters are soluble in solvents such as acetone. Such polyesters are formed mainly by esterification of a dihydric alcohol and a dibasic acid. Of course, such polyesters are really only "substantially" linear since it is not possible to avoid all cross-linking, at least through the unsaturated bonds in the polyester molecules. In fact, a linear (or substantially linear) polyester may be obtained even though in the preparation of such polyester a small proportion of the dihydric alcohol (e. g., less than about 5 mol per cent of the alcohol) is replaced by a polyhydric alcohol containing more than two alcohol radicals, such as glycerol or pentaerythritol, or a small proportion of the dibasic acid (e. g., less than about 5 mol per cent of the acid) is replaced by a polybasic acid containing more than two acid radicals, such as citric acid. The preferred linear polyester for use in the practice of the invention is prepared by carrying out the esterification reaction substantially to completion (i. e., to an acid number of less than about 40) without permitting substantial (addition) polymerization to take place. Although the esterification reaction is usually carried out under an inert gas atmosphere so as to exclude oxygen, various inhibitors may be used to prevent appreciable polymerization of the polyester during the esterification reaction.

In the preparation of the polymerizable unsaturated polyester, any of the usual modifiers such as monobasic acids, monohydric alcohols and natural resin acids may be added. The larger the proportions of monobasic acids and monohydric alcohols, the lower is the average number of acid and alcohol residues in the resulting polyester molecules, and the lower is the viscosity of the polyester. On the other hand, the more nearly equal the molecular proportions of dibasic acid and dihydric alcohol, the greater is the average number of residues in the resulting polyester molecules, and the greater is the viscosity. The proportions of ingredients used are those proportions that produce a polymerizable polyester of the desired viscosity. Other properties of the polyester, such as solubility in various solvents, also may be varied by selecting various reacting ingredients and varying their proportions. The infusibility, hardness and inertness of the product obtained by polymerization of the polyester may be increased by varying the initial reacting ingredients to increase the average number of double bonds per molecule of the polymerizable polyester.

The point to which the reaction of the ingredients is carried in the preparation of the polymerizable polyester is simply that point at which the product has the desired consistency. The consistency or viscosity of the polyester (prepared by reaction under conditions which prevent any appreciable addition polymerization) varies directly with the average number of acid and alcohol residues in the molecule. For example, the average number of residues in the molecule of the polyester may vary from about three to about one hundred twenty.

If desired, the reaction may be expedited by use of an acid substance as a catalyst. Any organic acid, inorganic acid or acid salt that is soluble in the reaction mixture may be employed as a catalyst, but it is desirable that any acid substance used be readily volatile or be of such a character that it has no deleterious effect in the final product. The amount of acid catalyst employed is simply that amount which accelerates the esterification to the desired degree.

The reaction is carried out at a temperature high enough and for a time long enough to secure the desired consistency. An elevated temperature preferably is employed to expedite the reaction, but during the preparation of the polyester, the temperature should not be so high nor the time of reaction so long as to cause substantial polymerization. There is less danger of premature polymerization if an inhibiting agent is added before the esterification is carried out.

Whenever added, an inhibiting agent is used in the proportion required to give the desired degree of inhibiting effect. It may be necessary to use different inhibitors in widely different proportions in order to secure the same inhibiting effect.

Any desired anti-oxidant such as hydroquinone, pyrogallol, tannic acid or any aromatic amine, such as aniline or phenylene diamine may be employed as an inhibitor.

The preparation of the unsaturated polyester preferably is carried out in an atmosphere of an inert gas such as carbon dioxide, nitrogen or the like, in order to prevent cross-linking through addition polymerization as well as to prevent darkening or to make it possible to obtain a pale or colorless product. Bubbling the inert gas through the reacting ingredients is advantageous in that the added gas serves the added functions of agitation and of expediting the removal of water formed by the reaction. Exclusion of oxygen is desirable not only because it causes discoloration, but also because it tends to produce premature polymerization at the elevated temperatures used.

The acid number of the product depends upon the degree of reaction and the proportions of acid and alcohol used for the reaction. With equimolecular proportions of dibasic acid and dihydric alcohol, the reaction may be carried to an acid number of about 20. The use of an acid catalyst may make it possible to attain a lower acid number without substantial polymerization.

A polymerizable polyester may be prepared by the following procedure:

A three-necked flask is employed in which 5.4 mols of maleic anhydride and 5.4 mols of diethylene glycol are mixed together. The flask is then fitted with a thermometer, a tube leading to a condenser and an inlet tube through which is introduced a moderate stream of carbon dioxide, and is lowered into an oil bath at a temperature of 210° C. During the subsequent reaction the distillate may be analyzed, and a sufficient amount of the ingredient lost in excess may be added to the flask from time to time to maintain the initial proportions of reacting ingredients. If the only addition is a sufficient amount of the ingredient lost in excess to maintain the initial proportions, the rate of removal of unreacted ingredients gradually decreases and substantially no unreacted ingredients may be left in the composition at the end of the reaction. After 8 hours at such temperature, a polyester is obtained in the form of a stiff liquid having an acid number of 18. If ethylene glycol were substituted for the diethylene glycol in the foregoing procedure, it would be difficult to reduce the acid number below 40 without causing polymerization, and the product would be a very thick gum.

Alternatively, this first procedure, as described in the foregoing paragraph, may be employed except that 1.5 instead of 5.4 mols of maleic anhydride and 1.5 instead of 5.4 mols of diethylene glycol are used together with an amount of hydroquinone equal to 0.2 per cent of the weight of the reacting ingredients; and reaction is continued for 6¼ hours. The resulting polyester is a moderately stiff liquid having an acid number of 11.

A further procedure that may be used is the same as the first procedure except that 2 instead of 5.4 mols of maleic anhydride and 2.1 instead of 5.4 mols of diethylene glycol are used; and the reaction is carried out for 4½ hours to produce a stiff liquid having an acid number of 14.

Another type of polymerizable polyester may be prepared by a procedure that is the same as the first procedure except that 3 instead of 5.4 mols of maleic anhydride and 3.3 instead of 5.4 mols of diethylene glycol are used together with an amount of hydroquinone equal to .09 per cent of the weight of the reacting ingredients and an amount of p-toluene sulfonic acid equal to 0.18 per cent of the weight of the reacting ingredient; and the reaction is carried out for four hours at 200° C. to produce a stiff liquid having an acid number of 10.6.

As a further alternative, the first procedure may be employed except that the amount of maleic anhydride employed is 6 instead of 5.4 mols; the diethylene glycol is replaced by 6 mols of ethylene glycol; a slower stream of carbon dioxide is used; and the ingredients are kept in an oil bath at 220° C. for 5½ hours. The resulting polyester is a very thick gum having an acid number of 53.

A polymerizable polyester may also be prepared by a procedure that is the same as in the preceding paragraph except that the maleic anhydride is replaced by 5 mols of fumaric acid; the ethylene glycol is replaced by 5 mols of diethylene glycol; and the reaction is continued for 8¼ hours. The resulting polyester is a stiff liquid having an acid number of 23. If in the foregoing procedure the diethylene glycol were replaced by an equimolecular proportion of ethylene glycol and half of the fumaric acid were replaced by an equimolecular proportion of phthalic anhydride, the product would be a hard brittle solid. The substitution of fumaric acid for maleic anhydride increases the length of time required to reach a given acid number at a given temperature. However, the accelerating effect of an acid catalyst upon the esterification is greater when fumaric acid is used. When fumaric acid is employed, other conditions being the same, the resulting polyester tends to be more viscous and greater care is necessary in order to prevent premature polymerization.

As further variation, the first procedure may be used except that the maleic anhydride is replaced by 1.5 mols of fumaric acid; the amount of diethylene glycol employed is 1.5 instead of 5.4 mols; and the temperature is varied between 200 and 220° C. After the reaction has been continued for 2½ hours, the acid number is 73. After 6 hours, the product is a stiff liquid having an acid number of 41.

A polymerizable polyester may also be prepared by a procedure that is the same as that of the preceding paragraph except that p-toluene sulfonic acid (1.5 grams) is added to the initial ingredients; and reaction for only 2½ hours instead of 6 hours is required to produce a stiff liquid having an acid number of 41.

A procedure that may also be used is the same as that of the next to the last paragraph except that the fumaric acid is replaced by 3.3 mols of maleic anhydride; the amount of diethylene glycol used is 3.0 instead of 1.5 mols; 1.5 grams of p-toluene sulfonic acid and 1.3 grams of hydroquinone are added to the initial ingredients; and the reaction is carried out for 3 hours to produce a limpid liquid having an acid number of 26.

A polymerizable polyester may be prepared by a procedure that is the same as the next to the last paragraph except that 3 instead of 1.5 mols of fumaric acid and 3.3 instead of 1.5 mols of diethylene glycol are used; and the reaction is carried out for 3 hours at temperatures ranging from 200–210° C. to produce a stiff liquid having an acid number of 12.

A further procedure that may be used is the same as that of the next to the last paragraph except that the hydroquinone is omitted; and reaction for 5 hours is required to produce a stiff liquid having an acid number of 28.

Another procedure that may be used is the same as the procedure of the next to the last paragraph except that the weight of p-toluene sulfonic acid is equal to 0.18 per cent of the weight of the reacting ingredients; an amount of hydroquinone equal to 0.09 per cent of the weight of the reacting ingredients is added at the start of the reaction; and reaction is carried out at 200° C. for 5 hours to produce a stiff liquid which has an acid number of 10.1.

Polymerization of these materials usually is carried out at temperatures of about 180° to about 210° F. A solution comprising one or more polymerizable unsaturated polyesters and one or more polymerizable monomeric compounds is particularly useful as a binder in the production of molding compositions of the invention. Either the unsaturated polyester or the monomeric compound or both may be partially polymerized before the ingredients are mixed. Polymerizable monomeric compounds that are useful for the preparation of such a solution include the polyallyl monomeric esters, examples of which include diallyl phthalate, diallyl oxalate, diallyl diglycolate, triallyl citrate, carbonyl bis-(allyl lactate), maleyl bis-(allyl lactate), fumaryl bis-(allyl lactate), succinyl bis-(allyl lactate), adipyl bis-(allyl lactate), sebacyl bis-(allyl lactate), phthalyl bis-(allyl lactate), fumaryl bis-(allyl glycolate), carbonyl bis-(allyl glycolate), carbonyl bis - (allyl salicylate), tetra - (allyl glycolate) silicate, and tetra-(allyl lactate) silicate.

A polymerizable unsaturated polyester alone or in solution as hereinbefore described may be used in any of the well known industrial polyester compositions, such as polyester molding compounds and polyester casting and adhesive compositions.

A polymerizable unsaturated polyester molding compound is a composition which consists essentially of a filler, a polymerizable polyester (or solution thereof) of the type hereinbefore described and a catalyst for the polymerization of such polyester, with any of the usual molding lubricants, plasticizers and coloring matter. In the molding compound the filler furnishes an improvement in the physical properties of the polymerized polyester, which, in turn, acts as a binder for the filler.

FILLER

Although dehydrated kaolin may be the sole filler in a polymerizable unsaturated polyester composition embodying the invention, usually it is desirable to use a filler combination in which part of the filler consists of mineral fibers (or a mixture thereof with other fillers hereinbefore described).

There are numerous types of mineral fiber fillers. One example of a mineral fiber filler is glass fiber, which has little natural attraction for moisture. Other mineral fibers such as asbestos also may be used in a composition of the invention. Although the term "asbestos" in commercial use has come to mean only the prevalent "Canadian asbestos," i. e., chrysotile (as the mineral occurring naturally and as the fibers resulting from processing the mineral), strictly speaking "asbestos" is a generic term applicable to silicate minerals having a fibrous structure. The term "asbestos" is used hereinafter in its more strict meaning, i. e., to include not only chrysotile fibers but also silicate mineral fibers which may be used as fillers.

Silicate mineral fibers are obtained principally from two mineral families, viz. serpentines and pyroboles. Both families contain non-fibrous as well as fibrous members. The most important fibrous serpentine is chrysotile, $3MgO.2SiO_2.2H_2O$, a hydrous silicate of magnesium. The pyroboles that may be used as fillers are minerals consisting essentially of silicates of divalent metals, having the general composition: $MO.SiO_2$, wherein M is a divalent metal; but they may also contain small amounts of monovalent metals (e. g., sodium) and trivalent metals (e. g., aluminum or ferric iron). Examples of such pyroboles include:

Diopside, $(Ca,Mg)O.SiO_2$, essentially a silicate of calcium and magnesium;
Wollastonite, $CaO.SiO_2$, a relatively pure silicate of calcium;
Anthophyllite, $(Mg,Fe)O.SiO_2$, essentially a silicate of iron and magnesium, usually with a little aluminum;
Tremolite, $3MgO.CaO.4SiO_2$, a relatively pure silicate of magnesium and calcium;
Actinolite, $3(Mg,Fe)O.CaO.4SiO_4$, similar to tremolite, but containing at least 3 per cent by weight of FeO; and
Others descriptively named mountain leather and mountain cork.

It is, of course, appreciated that the foregoing chemical formulas are only approximations because of isomorphous substitution. Fibrous pyroboles are available commercially in the form of the crude ore from the mine and in the form of fibers obtained by milling the ore (e. g., in a crusher) and then separating the fibers from the rock residue (e. g., by suction). Ordinarily, the fibers commercially available must be purified further for use as fillers, since such fibers usually contain a substantial amount of mineral impurities which affect deleteriously many of the properties of the hardened compositions. The necessity and extent of purification are determined by the nature of the impurities, their effect on the mechanical strength of molded articles and their damaging effect on the mold itself. Pyrobole fibers sufficiently purified for use as a filler may be obtained by carrying out a simple flotation process, e. g., by introducing water continuously into the bottom of a vessel equipped with an overflow and containing the pyrobole fibers, so that the impurities remain at the bottom of the vessel and the purified fibers float out with the overflowing water. If extreme purity of the fibers is required, tremolite fibers are preferred, since tremolite occurs naturally in a very pure state and often requires little or no further purification.

Fibrous pyroboles occur in various fiber lengths ranging up to as much as 7 inches, but the fiber lengths are reduced substantially in the ordinary milling process. No particular fiber length is required for pyrobole fibers used as fillers and the selection of the fiber length depends upon the desired properties and the intended use of the final product. For example, if the pyrobole fibers are to be used as a filler in a molding compound, the fibers are ground down to the size of ordinary fibrous fillers for use in such compounds, i. e., the fiber lengths of groups No. 6 and No. 7 of the Canadian Asbestos classification, at which the fibers appear to the naked eye to be similar in form to sawdust.

A filler combination comprising dehydrated kaolin and mineral fibers (e. g., anthophyllite fibers) performs an additional function in the practice of the invention by imparting better molding properties to a polymerizable unsaturated polyester composition than the molding properties of a polyester composition containing dehydrated kaolin as the sole filler. The use of a filler mixture also improves the impact strength of articles molded from the composition. When mineral fibers are employed as part of the filler in the practice of the invention, pyrobole fibers are preferred over mineral fibers such as chrysotile fibers, since the pyroboles impart superior water resistance and electrical properties to the polymerized compound.

Another aspect of the invention resides in the discovery that a composition comprising a polymerizable unsaturated polyester and, as a filler therefor, a base of a metal of group II of the periodic system and dehydrated kaolin (or mixtures thereof with mineral fibers) is superior to the other embodiments of the invention. A base of a metal of group II, when incorporated in a polymerizable unsaturated polyhydric alcohol-polycarboxylic acid polyester, not only imparts a substantial improvement in the physical and chemical properties of the composition but also imparts an improvement in the water-resistance and electrical properties of the polymerization product thereof. The incorporation of such a metal base in a polymerizable unsaturated polyester composition reduces substantially the stickiness of the composition and imparts to the composition a certain stiffness, thereby making the composition much easier to handle industrially. Also, such a metal base in a polymerizable polyester composition reduces substanially the tendency of the composition to stain or corrode a steel mold. One of the functions of the metal base is the neutralization of the free carboxylic acid radicals in the polyester (although the improvements obtained by the use of a metal base cannot be explained fully as being the result of such neutralization), therefore, a metal base, such as an oxide, which does not release a volatile material during neutralization is preferred.

The metals of group II of the periodic system include magnesium (atomic weight=24.3), calcium (atomic weight=40.1), zinc (atomic weight=65.4), strontium (atomic weight=87.6), cadmium (atomic weight=112.4), barium (atomic weight=137.4) and mercury (atomic weight=200.6). It is believed that beryllium (atomic weight=9) and radium (atomic weight=226.0) are too rare and expensive to be considered, and, accordingly, the metals of group II having atomic weights between 10 and 220 are the metals from which the base is formed that may be used in the practice of the invention.

A metal base may be defined as a compound which reacts with an acid to replace the "acid" hydrogen atom with the metal cation of the metal base, thereby forming the metal salt of such acid. Such a definition necessarily makes the meaning of the term "metal base" dependent, in part at least, upon the acid present. It is to be understood that the base of a metal of group II (as referred to herein) is one that is in fact a metal base with respect to the polymerizable polyester, which is present in the practice of the invention. In other words, the metal base is a compound which releases its cation to replace the hydrogen of the carboxy radicals in the polymerizable polyester. Presumably, such a carboxy radical acts as an acid in that it displaces acids weaker than itself from their salts, but will not displace acids stronger than itself from their salts. However, the term "metal base" does not include those metal salts, such as zinc stearate, which are used as lubricants or other modifiers in a polyester resin, because the salts of such long chain (i. e., over 6 carbon atoms) carboxylic acids apparently are not reactive enough to release the metal cation to replace the hydrogen of the carboxy radicals.

It has been found that the metal base used in the practice of the invention must be the substitution product of a substance with a labile hydrogen atom, having a dissociation constant (for the hydrogen) at least as small as about $3 \times 10^{-7}$, in which the labile hydrogen atom has been replaced by a valence of a metal of group II. In other words, in order that a compound of such a metal may be basic, is must be a compound of such a metal with a substance having a dissociation constant (for the labile hydrogen atom) equal to or less than that of carbonic acid. The most common examples of such metal bases include the oxides, hydroxides, borates, carbonates, and alcoholates such as the methoxides and ethoxides of such metals.

Catalysts

Since the polymerizable polyester is fusible and plastic at relatively low temperatures, it is possible to adjust the amounts of catalyst and inhibiting agent so that the hardening at such temperatures takes place at a reasonable rate to allow ample opportunity for shaping and molding of the composition. In this manner molding compounds may be produced which are fast curing, gas free and adapted to complicated moldings (e. g., clock cases).

The preferred catalyst for use in the practice of the invention is benzoyl peroxide, but any other organic peroxide (not containing polymerization-inhibiting radicals), such as succinyl peroxide, t-butyl perbenzoate, di-t-butyl perphthalate, acetyl peroxide, peracetic acid, perbenzoic acid, toluyl peroxide, p-bromobenzoyl peroxide, anisoyl peroxide, chloroacetyl peroxide, acetyl benzoyl peroxide, diacetyl peroxide and furoyl peroxide; or any organic ozonide (not containing polymerization-inhibiting radicals), such as di-isopropylene ozonide or di-isobutylene ozonide, or a mixture of such substances may be used as the curing catalyst.

Preparation of Polymerizable Composition

In the production of a molding compound embodying the invention the mixing of the filler with the polymerizable polyester may be carried out by any of the known methods. If the polyester is very viscous, it may be necessary to incorporate the filler in the polyester in a heated two-roll (differential speed) rubber mill or it may be desirable to heat the polyester in order to reduce the viscosity sufficiently to permit the use of other mixing procedures. Ordinarily the viscosity of the polyester is such that kneading or equivalent mixing apparatus (e. g., Banbury mixer) may be used satisfactorily. In some cases it may be desirable to dilute the polyester with a solvent in order to facilitate mixing with the filler. In the production of casting and adhesive compositions embodying the invention the mixing of the filler with the polymerizable polyester may be carried out by any of the known methods, for example, by heating the polyester to reduce its viscosity, thus permitting the use of the ordinary mixing methods hereinbefore described for the preparation of a molding compound.

The proportion of dehydrated kaolin used as a filler in a polymerizable unsaturated polyester molding composition embodying the invention may range from the minimum amount capable of appreciably improving the physical properties of the hardened product (i. e., about 5 per cent of the composition) to the maximum proportion which may be held together or bound satisfactorily by the polyester (i. e., about 85 per cent of the composition). In general, the preferred range for a mineral filler such as dehydrated kaolin is from about 62½ per cent to about 72½ per cent of the composition, and the optimum results are obtained in the upper portion of such range.

When a mixture of dehydrated kaolin with a mineral fiber filler is employed in the preparation of a polymerizable unsaturated polyester molding composition embodying the invention, the total proportion of filler may range from about 5 per cent to about 80 per cent of the composition, and the preferred proportion is from about 60 to about 70 per cent of the composition, the optimum results being obtained when the proportion of filler is in the upper portion of such range.

In the practice of the invention at least appreciable amounts of both dehydrated kaolin and mineral fibers are used in such a filler combination in order to obtain the benefit of the improvements, such as reduction in brittleness, which are imparted by the fibrous component, as well as the improvements which are imparted by dehydrated kaolin. In general, the proportion of dehydrated kaolin to mineral fibers in the filler mixture may range from the minimum proportion at which the effect of dehydrated kaolin is noticeable (i. e., about 1:100) to the maximum proportion at which the effect of the mineral fibers is noticeable (i. e., about 6:1). The optimum results are obtained when the proportion of dehydrated kaolin to mineral fibers ranges from about 1:1 to about 2:1.

Casting and adhesive compositions embodying the invention may contain as little as one per cent of filler, and the maximum per cent of filler in such a composition is simply that amount which may be added to the polyester composition without rendering the composition too viscous to handle. For example, in a casting composition embodying the invention the maximum proportion of filler may be about 40 per cent of the composition, and the preferred proportion of filler ranges from about 20 per cent to about 30 per cent of the composition.

The full benefit of the use of a base of a metal of group II of the periodic system in the practice of the invention is obtained simply by incorporating the metal base in the polyester composition in the same manner as any filler, according to the procedures hereinbefore described. The metal base may be incorporated in the polyester in a separate step or at the same time as the fillers hereinbefore mentioned. In fact, although the metal base has several chemical functions, it also functions physically as part of the filler. In determining the total amount of filler, the amount of metal base is added to the amount of other filler used, and the total proportion of filler thus calculated should be within the limits hereinbefore described.

In actual practice the amount of the metal base used may range from a mere appreciable amount based on the chemical function of the metal base (i. e., the slightest excess over that amount required to neutralize the polyester, so that even with a theoretically complete reaction there would still be a slight amount of metal base present) to a maximum proportion which depends upon the properties of the individual metal base. The considerations involved include the alkalinity, chemical activity and solubility of the metal base, as well as the physical character of the metal base when it is considered merely as a portion of the filler. However, ordinarily the metal bases are sufficiently inactive and insoluble so that the essential consideration in the determination of the maximum proportion is purely a physical matter, and such a base is considered a part of the filler. In a molding compound embodying the invention the preferred proportion of such a metal base ranges from about 2 per cent to about 20 per cent of the total filler.

In the practice of the invention a solution comprising one or more polymerizable unsaturated polyesters and one or more polymerizable monomeric compounds is particularly advantageous, because the polyester has desirable physical properties and hardens very rapidly, whereas the presence of the monomeric compound causes the polymerized product to be much more water resistant and insoluble. Moreover, the combination (solution) of the polyester and the monomeric compound usually polymerizes much more rapidly than either of such substances alone. Such a solution usually contains about 5 per cent to about 35 per cent of the polymerizable monomeric compound and about 95 per cent to about 65 per cent of the polymerizable polyester.

A solution similar to that obtained by dissolving the polyester in a monomeric compound hereinbefore described may be prepared by dissolving the polyester, before use, in a polymerizable substance such as styrene, vinyl acetate, methylmethacrylate or methylacrylate.

The proportion of curing catalyst used in the practice of the invention is simply the proportion that causes the composition to polymerize at the desired rate, and as the term "catalyst" implies, such proportion is the usual catalytic amount, i. e., ranging from about 0.01 per cent to about 5 per cent of the composition. The preferred proportion of curing catalyst varies with the different catalysts, and the amount of any particular curing catalyst required to produce a given rate of hardening may vary also with variations in the nature of the polymerizable composition. For example, a polyester prepared from maleic anhydride and diethylene glycol, in a molding compound of the invention containing about 3 per cent of benzoyl peroxide, may be cured at approximately the same rate as a molding compound, containing a similar polyester prepared from fumaric acid and diethylene glycol, in which the proportion of benzoyl peroxide is about 0.5 per cent.

If the binder used in the practice of the invention comprises a viscous polymerizable substance and a less viscous polymerizable substance, the polymerization catalyst may be dissolved in the less viscous polymerizable substance before the two substances are mixed. On the other hand, it is often desirable to disperse the polymerization catalyst in the filler by grinding it with the filler in a ball mill, for example, before the filler is mixed with the polyester. In some cases a filler may be mixed with a solution (in a volatile solvent) of the polymerization catalyst and dried before the filler is mixed with the polyester. When the present method is carried out in the production of a molding compound or a casting composition, plasticizers, lubricants, pigments and other coloring matter may be incorporated if desired.

Insulation resistance is one of the most important qualifications of a synthetic resin for use in electrical applications. Insulation resistance may be defined as the resistance offered to the flow of a current when a voltage is impressed between two electrodes embedded in a hardened composition at a standard distance (i. e., 1¼ inches between the centers of the electrodes in the standard test used to measure the insulation resistance of compounds embodying the invention). Ordinarily, polymerized polyester compositions containing a filler are particularly subject to deterioration in insulation resistance when exposed to high relative humidities and hgh temperatures. However, compounds embodying the invention, which comprise a polymerized unsaturated polyester and a filler, are greatly improved in the retention of their insulation resistance.

The superiority of the retention of insulation resistance of compounds embodying the invention may be demonstrated by tests carried out as follows:

A polymerizable unsaturated polyester (87.5 grams of a polyester prepared by the procedure hereinbefore described, by esterifying 1.0 mol of ethylene glycol with 0.2 mol of phthalic anhydride and 0.8 mol of maleic anhydride to an acid number of 35) is mixed in a Banbury mixer with a polymerizable unsaturated liquid monomer (47.1 grams of diallyl diglycolate), a catalyst paste consisting of tricresyl phosphate (2.7 grams) and benzoyl peroxide (2.7 grams), a standard kaolin filler (360 grams) and a lubricant (10 grams of zinc stearate), and the mixing is continued until a homogeneous composition is obtained. The putty-like material (hereinafter referred to as composition A) is then passed through warm rubber rolls to form sheets of a thickness of approximately ⅛ inch, and is molded for one minute under a pressure of 17,000 pounds per square inch of projected area in a mold heated with steam at 75 pounds per square inch gauge pressure, to form articles suitable for physical testing.

A composition, B, is prepared by the procedure described in the preceding paragraph except that the filler used is dehydrated kaolin (360 grams of Pigment No. 33, Southern Clays, Inc.). The putty-like material (hereinafter referred to as composition B) is then sheeted and molded in the manner hereinbefore described to form articles suitable for physical testing.

In an accelerated test used to determine the retention of insulation resistance of compounds embodying the invention, the polymerized compositions are exposed to high relative humidities and high temperatures for prolonged periods of time to promote the breakdown of their insulation resistance. The retention of the insulation resistance of articles molded from compositions A and B (prepared as hereinbefore described) is tested as follows: The insulation resistance is determined by measuring the resistance (in megohms) offered to the flow of a current when a voltage is impressed between two electrodes so embedded in a molded article that there is a distance of 1¼ inches between the centers of the electrodes. Molded articles of compositions A and B are exposed to high temperatures and high relative humidities for given periods of time, and the insulation resistance is tested before and after exposure of the samples to such conditions. The results of the initial insulation resistance tests (line 1) and of the insulation resistance tests after exposure to a temperature of 160° F. and a relative humidity of 95 per cent for one day (line 2), two days (line 3) and seven days (line 4) are given in Table 1 (below).

*Table 1*

| Insulation Resistance | A | B |
|---|---|---|
| | *Megohms* | *Megohms* |
| 1. Initial | over 1,000,000 | over 1,000,000 |
| 2. 1 day | 5,000 | 325,000 |
| 3. 2 days | 180 | 150,000 |
| 4. 7 days | 10 | 22,000 |

As the results in Table 1 indicate, the retention of insulation resistance of a polymerized compound of the invention (B) comprising dehydrated kaolin is highly superior to the retention of insulation resistance of a compound (A) which is the same except that a standard kaolin filler is used.

The use of dehydrated kaolin in the practice of the invention also imparts improved water resistance to polymerizable unsaturated polyester compositions. (The amount of moisture that an article is capable of absorbing is an indication of the water resistance, because the degree of deterioration upon exposure to moisture usually varies with the amount of water absorbed.)

The superiority of the water resistance of polymerized compositions embodying the invention may be shown by the following tests (the water resistance tests employed are standard tests for plastic materials and are considered to be capable of showing the water resistance characteristics that are important in industrial materials of this class): Samples of compositions A and B are molded as hereinbefore described to form two-inch diameter disks having a thickness of about ⅛ inch. Each test piece is immersed in water for a given period of time and the water absorption is measured as the gain in weight (in grams) during immersion. In Table 2 (below) the water absorption (in grams) is given for tests in which the disks are immersed in cold water for one day (line 1), two days (line 2) or seven days (line 3), or in boiling water for one hour (line 4). The Barcol hardness is given for the test pieces before (line 5) and after (line 6) immersion in boiling water for one hour.

*Table 2*

| | A | B |
|---|---|---|
| 1. Cold Water Absorption (1 day) | 0.03 | 0.015 |
| 2. Cold Water Absorption (2 days) | 0.045 | 0.02 |
| 3. Cold Water Absorption (7 days) | 0.105 | 0.05 |
| 4. Boiling Water Absorption (1 hour) | 0.055 | 0.025 |
| 5. Barcol Hardness (Before) | 59 | 72 |
| 6. Barcol Hardness (After) | 48 | 67 |

As the results in Table 2 indicate, the water resistance of a polymerized compound of the invention (B) comprising dehydrated kaolin is superior to the water resistance of a compound (A) which is the same except that a standard kaolin filler is used.

The following examples illustrate the practice of the invention.

EXAMPLE 1

A material embodying the invention is prepared by the following procedure:

A polymerizable binder, consisting of a polymerizable unsaturated polyester (116.8 grams, prepared from a charge consisting of 1.0 mol of maleic anhydride, 0.85 mol of monoethylene glycol, 0.2 mol of propylene glycol and an amount of hydroquinone equal to 0.06 per cent of the charge, esterified by the procedure hereinbefore described to an acid number of about 30) and a polymerizable unsaturated liquid monomer (13 grams of diallyl phthalate), is mixed in a Banbury mixer with a catalyst paste consisting of tricresyl phosphate (2.6 grams) and benzoyl peroxide (2.6 grams), a filler consisting of anthophyllite fibers (160 grams), dehydrated kaolin (160 grams of Pigment No. 33) and a metal base (45 grams of zinc oxide), and a lubricant (10 grams of zinc stearate). The material is sheeted through warm rubber rolls, allowed to solidify fully while at a temperature between 80 and 90° F. and then granulated in a high speed cutter to a maximum particle diameter of about ⅛ inch. The granulated composition is compression molded to produce articles of dimensions suitable for physical testing.

Tests to determine the retention of insulation resistance and the water resistance of articles molded from the composition are conducted as hereinbefore described. The initial insulation resistance is over 1,000,000 megohms, and the insulation resistance after exposure to a temperature of 160° F. and a relative humidity of 95 per cent is 225,000 megohms after one day, 14,000 megohms after two days, and 165 megohms after seven days. The water absorption of a test piece (prepared as hereinbefore described) is 0.045 grams after immersion in boiling water for one hour, and the water absorption of a test piece immersed in cold water is 0.01 gram after one day, 0.015 gram after two days, and 0.04 gram after seven days. The Barcol hardness of an article molded from the composition is 60 in an initial test and, after immersion of the molded article in boiling water for one hour, the Barcol hardness is 52.

EXAMPLE 2

A polymerizable unsaturated polyester (87.5 grams prepared by esterifying 1.0 mol of ethylene glycol with 0.2 mol of phthalic anhydride and 0.8 mol of maleic anhydride by the procedure hereinbefore described to an acid number of 35) is mixed in a Banbury mixed with a polymerizable unsaturated liquid monomer (47.1 grams of diallyl diglycolate), a catalyst paste consisting of tricresyl phosphate (2.7 grams) and benzoyl perioxide (2.7 grams), a dehydrated kaolin filler prepared as hereinbefore described (360 grams of Burgess Pigment No. 30) and a lubricant (10 grams of zinc stearate). The mixing is continued until a soft, homogeneous dough is obtained, and the putty-like composition is passed through warm rubber rolls to form sheets of a thickness of about ⅛ inch. The sheeted material is then molded to produce articles suitable for physical testing. The water absorption of a test piece (prepared as hereinbefore described) is 0.025 gram after immersion in boiling water for one hour, and the water absorption of a test piece immersed in cold water is 0.015 gram after one day, 0.02 gram after two days, and 0.035 gram after seven days. The Barcol hardness of a test piece is 74 in an initial test, and, after immersion of the test piece in boiling water for one hour, the Barcol hardness is 66.

EXAMPLE 3

A polymerizable unsaturated polyester (96.9 grams of a polyester prepared as described in the preceding example) is mixed in a Banbury mixer with a polymerizable unsaturated liquid monomer (52.1 grams of diallyl diglycolate), a catalyst paste consisting of tricresyl phosphate (3 grams) and benzoyl peroxide (3 grams), a filler consisting of dehydrated kaolin (320 grams of Burgess Pigment No. 30) and anthophyllite fibers (140 grams), and a lubricant (10 grams of zinc stearate). The mixing is continued until a soft, homogeneous dough is obtained, and the putty-like composition is passed through warm rubber rolls to form sheets of a thickness of about ⅛ inch. The sheeted material is then molded to produce articles having improved water resistance and improved retention of insulation resistance.

I claim:

1. A material which upon polymerization has improved water resistance and electrical properties, comprising dehydrated kaolin and a polymerizable unsaturated polyhydric alcohol-polycarboxylic acid polyester whose molecule contains a plurality of polymerizably reactive $\Delta^{2,3}$-enedioyl groups, the kaolin:polyester weight ratio ranging from 85:15 to 1:100 and the kaolin having been dehydrated by calcining at 600–1200° C.

2. A molding compound that produces molded articles of improved water resistance and electrical properties, comprising (1), as a binder, a polymerizable unsaturated polyhydric alcohol-polycarboxylic acid polyester whose molecule contains a plurality of polymerizably reactive $\Delta^{2,3}$-enedioyl groups and, (2) as a filler therefor, dehydrated kaolin which has been hydrated by calcining at 600–1200° C.

3. A molding compound that produces molded articles of improved water resistance and electrical properties, comprising (1), as a binder, a polymerizable unsaturated polyhydric alcohol-polycarboxylic acid polyester whose molecule contains a plurality of polymerizably reactive $\Delta^{2,3}$-enedioyl groups and, (2) as a filler therefor, dehydrated kaolin and mineral fibers, the kaolin:mineral fiber weight ratio ranging from 1:100 to 6:1 and the kaolin having been dehydrated by calcining at 600–1200° C.

4. A molding compound that produces molded articles of improved water resistance and electrical properties, comprising (1), as a binder, a polymerizable unsaturated polyhydric alcohol-polycarboxylic acid polyester whose molecule contains a plurality of polymerizably reactive $\Delta^{2,3}$-enedioyl groups and, (2) as a filler therefor, a base of a metal of group II of the periodic system and dehydrated kaolin which has been dehydrated by calcining at 600–1200° C., the amount of the base ranging from 2 to 20 per cent of the total weight of the filler.

5. A molding compound that produces molded articles of improved water resistance and electrical properties, comprising (1), as a binder, a polymerizable unsaturated polyhydric alcohol-polycarboxylic acid polyester whose molecule contains a plurality of polymerizably reactive $\Delta^{2,3}$-enedioyl groups and, (2) as a filler therefor, a base of a metal of group II of the periodic system, mineral fibers and dehydrated kaolin which have been dehydrated by calcining at 600–1200° C., the weight ratio of the kaolin to the mineral fibers ranging from 1:100 to 6:1 and the amount of the base ranging from 2 to 20 per cent of the total weight of the filler.

6. A material of improved water resistance and electrical properties, comprising the product of the polymerization of the material claimed in claim 1.

7. A molded article of improved water resistance and electrical properties, comprising the product of the polymerization of the material claimed in claim 2.

8. A molded article of improved water resistance and electrical properties, comprising the product of the polymerization of the material claimed in claim 3.

9. A molded article of improved water resistance and electrical properties, comprising the product of the polymerization of the material claimed in claim 4.

10. A molded article of improved water resistance and electrical properties, comprising the product of the polymerization of the material claimed in claim 5.

11. A molding compound comprising (1), as a binder, a polymerizable unsaturated linear glycol-alkenedicarboxylate, each of the alkenedicarboxyl radicals therein having from 4 to 5 carbon atoms and having the carboxyl groups attached to adjacent carbon atoms, and (2), as a filler therefor, kaolin which has been calcined at 600–1200° C.

12. A molding compound comprising (1), as a binder, a polymerizable unsaturated linear dihydric alcohol-dicarboxylic acid polyester whose molecule contains a plurality of butenedioyl radicals and (2), as a filler therefor, mineral fibers and kaolin which have been calcined at 600–1200° C., the kaolin:mineral fiber weight ratio ranging from 1:100 to 6:1.

13. A molding compound comprising (1), as a binder, a polymerizable unsaturated linear dihydric alcohol-dicarboxylic acid polyester whose molecule contains a plurality of butenedioyl radicals and (2), as a filler therefor, a base of a metal of group II of the periodic system, and kaolin which has been calcined at 600–1200° C.

14. A molding compound comprising (1), as a binder, a polymerizable unsaturated linear glycol-phthalate-butenedioate and a compatible polyallyl monomeric ester copolymerizable therewith and (2), as a filler therefor, kaolin which has been calcined at 600–1200° C.

THOMAS F. ANDERSON.

REFERENCES CITED

The following references are of record in the file of this patent:

UNITED STATES PATENTS

| Number | Name | Date |
| --- | --- | --- |
| 2,356,297 | Balassa | Aug. 22, 1944 |
| 2,448,609 | Malm | Sept. 7, 1948 |